INVENTORS
HERMANN OBERST
JOACHIM EIBIGT
GÜNTHER DUVE
ALFRED SCHOMMER

United States Patent Office 3,674,625
Patented July 4, 1972

3,674,625
VIBRATION DAMPED SANDWICH SYSTEMS HAVING INTERLAYERS OF VINYL ACETATE/N-BUTYL ACRYLATE/DIBUTYL MALEATE/CROTONIC ACID COPOLYMERS
Hermann Oberst, Hofheim, Taunus, Joachim Ebigt and Gunther Duve, Frankfurt am Main, and Alfred Schommer, Bad Soden, Taunus, Germany, assignors to Farbwerke Hoechst Aktiengesellschaft vormals Meister Lucius & Bruning, Frankfurt am Main, Germany
Continuation-in-part of abandoned application Ser. No. 684,740, Nov. 21, 1967. This application Dec. 14, 1970, Ser. No. 98,012
Claims priority, application Germany, Nov. 25, 1966, F 50,758
Int. Cl. B32b 15/08; C08f 15/20; E04b 1/86
U.S. Cl. 161—165                             4 Claims

ABSTRACT OF THE DISCLOSURE

A vibration damped sandwich system comprising two hard plates and interposed between the plates a vibration damping interlayer comprising a copolymer of 30 to 40% by weight of vinyl acetate, 30–40% by weight of n-butyl acrylate, 30 to 10% by weight of dibutyl maleate and 5 to 15% by weight of crotonic acid.

---

Figure 1A:
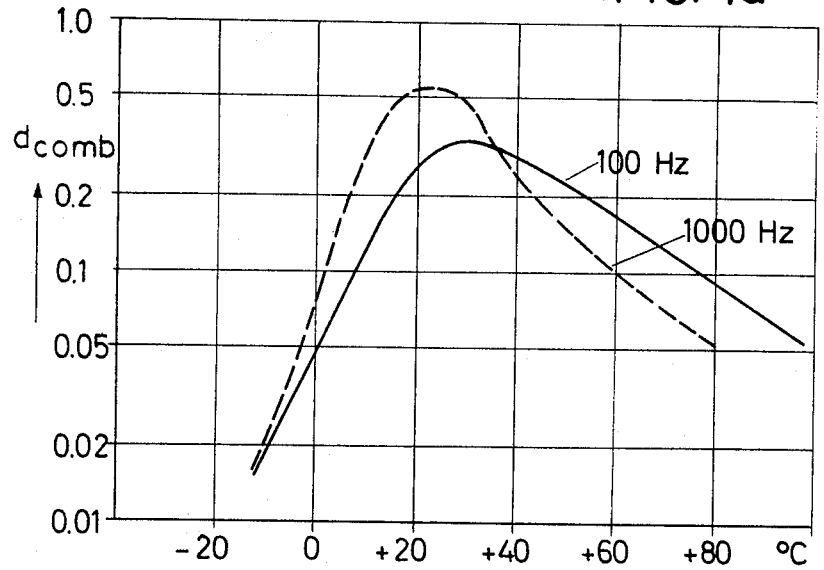

This application is a continuation-in-part of application Ser. No. 684,740 filed Nov. 21, 1967 and now abandoned.

The present invention provides vibration damped sandwich systems having interlayers made of vinyl acetate/n-butyl acrylate/dibutyl maleate/crotonic acid copolymers.

It is known from South African specification No. 5,269 that highly valuable vibration damping materials of a broad temperature band suitable for damping bending vibrations of metal sheet constructions can be prepared by copolymerizing monomers whose homopolymers differ in their second order transition temperature by at least 20° C. The above specification also reports that as vibration damping materials having a broad temperature band there can be used, among others, predominantly amorphous copolymers of esters of alcohols with 4 to 12 carbon atoms with acrylic and maleic acid and vinyl esters of fatty acids with 2 to 3 carbon atoms, for example vinyl acetate/n-butyl acrylate and/or dibutyl maleate copolymers.

It has now been found that copolymers of vinyl acetate, suitable esters of unsaturated polymerizable carboxylic acids and an unsaturated copolymerizable acid, preferably crotonic acid have outsanding damping properties and are especially suitable for the vibration damping of sandwich systems of hard plates, in particular metal sheets. Suitable esters are especially those of acrylic acid and maleic acid with alcohol components having 3 to 9 carbon atoms, preferably n-butyl acrylate and dibutyl maleate. With these copolymers, the vibration damping effect of which critically depends on the weight proportion of the monomers, very broad damping curves can be obtained having very high maximum damping values. From the economical point of view they have the advantage of being rather cheap.

Copolymers consisting of 30 to 40% by weight of vinyl acetate, 30 to 40% by weight of n-butyl acrylate, 30 to 10% by weight of dibutyl maleate and approximately 10% by weight of crotonic acid constitute excellent broad band damping materials which can be used in a large range of temperature.

The present invention provides sandwich systems of hard plates, in particular metal sheets, having vibration damping, self-adherent interlayers of vinyl acetate/n-butyl acrylate/dibutyl maleate/crotonic acid copolymers, for which interlayers there are used copolymers consisting of 30 to 40% by weight of vinyl acetate, 30 to 40% by weight of n-butyl acrylate, 30 to 10% by weight of dibutyl maleate and 5 to 15% by weight of crotonic acid.

A copolymer having satisfactory vibration damping characteristics was prepared according to the procedure set forth in Example I below.

EXAMPLE I

A mixture composed of 35 g. (34.2%) vinyl acetate
35 g. (34.2%) n-butyl acrylate
20 g. (19.6%) di-n-butylmaleate
10 g. (9.8%) crotonic acid
5 g. isopropanol and
2 g. (1.96%) dibenzoyl peroxide (of approx. 72.8% strength)

was slowly heated in a glass reaction vessel provided with reflux condenser and thermometer. When the temperature had reached approximately 80° C., refluxing commenced, and at a temperature of approximately 90° C. the increased viscosity showed that polymerization had started. The temperature was raised to 190° C. and maintained at this level for 1½ hours and then the residual monomer was distilled off under reduced pressure. The molecular weight of the copolymer was about 54,000.

Figure 1B:
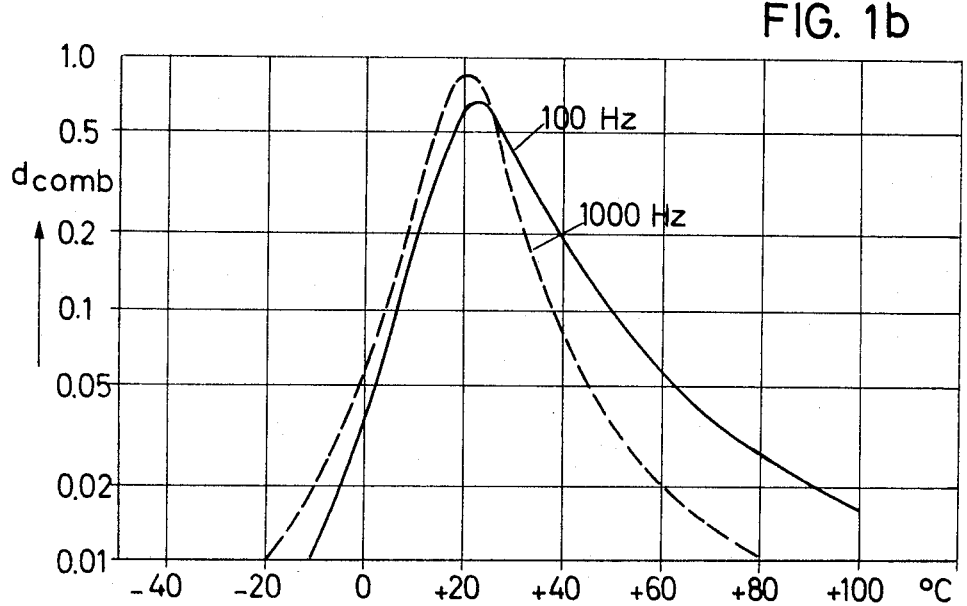

FIGS. 1a and 1b of the accompanying drawings are plots against temperature of the loss factor $d_{comb}$ to illustrate the superior efficiency of the novel systems. The curve in FIG. 1a shows the loss factor $d_{comb}$ of a metal sheet arrangement of the invention as a function of temperature. For comparison, one of the most effective vibration damping materials known for metal sheet arrangements was used, namely a copolymer of 63% by weight of vinyl acetate and 37% by weight of dibutyl maleate containing as plasticizer 15% by weight of 2-ethylhexyl phthalate and 15% by weight of tricresyl phosphate, calaculated on the mixture (curve FIG. 1b). The copolymer of curve 1b was a thermoplastic adhesive especially suitable for producing vibration damped metal sheet sandwich systems comprising two outer metal sheets and a self-adherent thermoplast as damping interlayer. Systems of this type provide a damping effect which is extremely high in its maximum and cannot be exceeded for physical reasons (cf. H. Oberst and A. Schommer, Kunststoffe, volume 55, page 634 (1965), especially FIG. 9). In a symmetrical arrangement comprising two metal sheets, each having a thickness of 0.5 millimeter, and an interlayer 0.3 millimeter thick, the loss factor $d_{comb}$ of the combined system, measured in the bending wave method (cf. for example H. Oberst, L. Born and F. Linhardt, Kunststoffe, volume 51, page 495 (1961), almost reaches the value $d_{comb}$ of 1. The known metal sheet damping by one-side damping coatings which are applied by spraying, trowelling or bonding in the form of layers of sognerally of less than $d_{comb}$=0.2 with technically reasonable thicknesses or rations of coating mass to plate mass of the combined system. With metal sheet sandwich systems which gain growing importance in recent times, it is possible to obtain damping values that are increased by a multiple, as shown by the present example, when the interlayer material has the appropriate composition and thickness.

The temperature band width of the damping of the metal sheet sandwich system does not only depend on the viscoelastic properties of the interlayer and the steel sheets but also to a considerable extent on the "geometry" of the arrangement, i.e. on the ratio of the layer thicknesses (cf. loc. cit. (1965), FIGS. 8 to 10). With metal sheet sandwich systems the band width is advantageously defined as the range of the temperature interval within which the value $d_{comb}=0.05$ is exceeded. The damping of metal sheets which are not damped by additional vibration damping means in metal sheet constructions of various types correspond to values $d_{comb}=0.01$. The reference value $d_{comb}$ of 0.05 thus means a considerable increase in the damping effect (by about 15 db (decibel)) as compared to the "nil damping" $d_{comb}=0.01$.

In the curve shown in FIG. 1b the reference value $d_{comb}$ of 0.05 is exceeded in the mainly interesting frequency range of from 100 to 1,000 c.p.s. (Hz.) at temperatures ranging from about 0 to 50° C. The temperature band width thus corresponds to about 50° C. Sandwich systems of this type are suitable for many technical fields of application. By modifying the content of plasticizer, it is possible to shift the temperature band of a high damping effect to higher temperatures and thus to adapt the material to special technical uses, for example in machine units operating at elevated temperatures. This example of a metal sheet sandwich system comprising a self-adherent interlayer having optimum properties of a vibration damping material with a broad temperature band prepared by copolymerizing appropriate monomeric compounds has hitherto not been surpassed by other arrangements of similar kind and may be taken as standard for judging the acoustic efficiency of the system according to the invention.

FIGS. 1a and 1b show the temperature curves of the loss factor $d_{comb}$ of metal sheet sandwich systems comprising steel sheets of a thickness of 0.5 millimeter each and damping interlayers of a thickness of 0.3 millimeter for a frequency of 100 c.p.s. and 1,000 c.p.s.

The curves were measured with sandwich systems the interlayers of which consisted of (1a) a copolymer of 35% by weight of vinyl acetate, 35% by weight of n-butyl acrylate, 20% by weight of dibutyl maleate and 10% by weight of crotonic acid (according to the invention),
(1b) a copolymer of 63% by weight of vinyl acetate and 37% of dibutyl maleate containing as plasticizer 15% by weight of 2-ethylhexyl phthalate and 15% by weight of tricresyl phosphate, calculated on the mixture.

The arrangement 1a, whose monomer proportion lies in the optimum range has a very broad temperature band width with relatively high maximum damping values that come near to the values of arrangement 1b. With the arrangement 1a the center of damping is at 20 to 30° C. with maximum damping values of about 0.3 to 0.6. The temperature band width is about 100° C. for 100 c.p.s. and about 80° C. for 1,000 c.p.s. In arrangement 1a, the slow decrease of the damping towards high temperatures at 100 c.p.s. and 1,000 c.p.s. is especially favorable. The reference value $d_{comb}$ of 0.05 is exceeded at a temperature in the range of from about 0 to about 90° C. As compared with the standard system 1b, arrangement 1a has an appreciably broader temperature band width. The excellent vibration damping properties are maintained up to a temperature of about +90° C., with the low frequencies of 100 c.p.s. that are especially interesting even there above, so that arrangements of this type are suitable for quite a number of applications, especially at high temperatures (for example, in machine units). Owing to its content of 10% by weight of crotonic acid the copolymer used in arrangement 1a can be cross-linked by reaction with a bifunctional or trifunctional compound (for example a compound containing a plurality of epoxide, isocyanate or similar groups), whereby the softening range and therewith the range of high damping can be noticeably shifted towards higher temperatures.

A special advantage of the vibration damping material of the present invention resides in the fact that it may be applied continuously during the mass production of the metal sheet sandwich systems. It is a thermoplastic adhesive which may be applied to the metal sheets by trowelling, brushing or pouring at elevated temperature. The sandwich system may then be advantageously cooled under pressure between rollers. Except for degreasing the metal sheets do not require a preliminary treatment and further adhesive. Owing to the content of the copolymer of crotonic acid degreasing may even be dispensed with. The adhesion is very good.

The vibration damping material of the present invention has a good resistance to flow. The metal sheet sandwich system may, within broad limits, be processed as normal metal sheets, that is they may be creased, bent, shaped, welded and riveted. They may even be deep-drawn provided that the radii of curvature are not too small. In this manner laminated systems are obtained which are well suitable for many applications, especially at relatively high temperatures.

Minor amounts of fillers, for example, for improving the electric conductivity (improvement of resistance welding) may be incorporated in the vibration damping materials. In order not to affect the damping effect adversely it is advantageous to use less than 1% by weight, preferably less than 0.5% by weight of filler, calculated on the copolymer. Suitable fillers are, for example, heavy spar, silicic acid, graphite and soot.

The metal sheet sandwich system suitably has a total thickness in the range of from 1 to 6 millimeters. The interlayers may have a thickness of 0.1 to 1 millimeter, preferably 0.2 to 0.5 millimeter. A maximum damping effect is obtained with symmetrical laminated systems. With an equal weight, asymmetrical laminated systems have, however, a higher stiffness in flexure and strength. Asymmetrical laminated systems are, therefore, preferred for those applications which require a high strength with respect to the weight. The ratio of the thicknesses of the outer plates or metal sheets is preferably within the range of from 1:1 to 1:4.

Figure 2A:
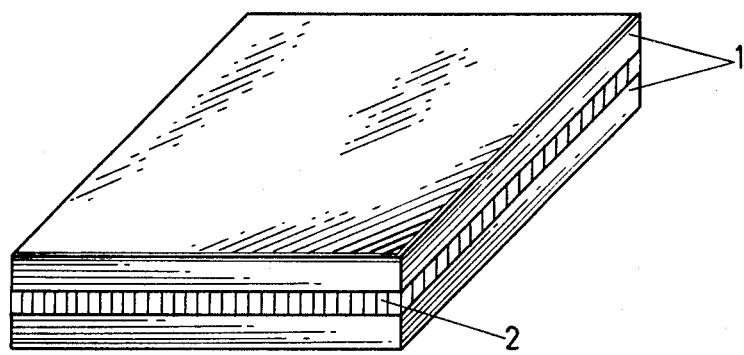
Figure 2B:
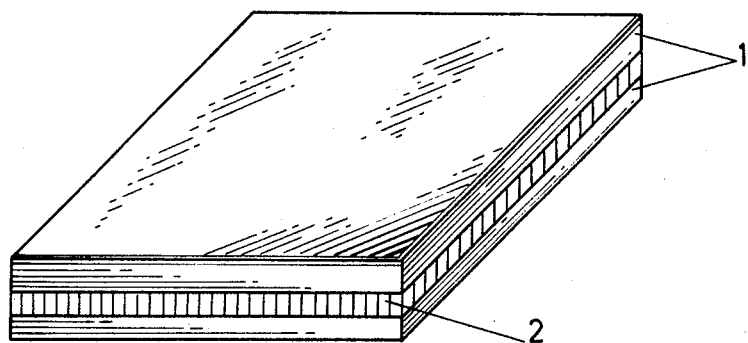

FIG. 2 of the accompanying drawings show sandwich systems with symmetrical arrangement ( a) and asymmetrical arrangement (b) in which the interlayer 2 is interposed between the two outer plates or metal sheets 1.

What is claimed is:

1. A vibration damped sandwich system consisting essentially of two hard plates and interposed between the plates a vibration damping interlayer comprising a copolymer of 30 to 40% by weight of vinyl acetate, 30–40% by weight of n-butyl acrylate, 30 to 10% by weight of dibutyl maleate and 5 to 15% by weight of crotonic acid.

2. A vibration damped sandwich system as claimed in claim 1, wherein the hard plates are metal sheets.

3. A vibration damped sandwich system as claimed in claim 1, wherein the copolymer of the interlayer contains up to 1% by weight of a filler, calculated on the copolymer.

4. A vibration damped sandwich system as claimed in claim 1, wherein the ratio of the thicknesses of the plates lies preferably in the range of from 1:1 to 1:4.

References Cited

UNITED STATES PATENTS

| | | | |
|---|---|---|---|
| 3,271,181 | 9/1966 | Albert et al. | 161—218 |
| 3,275,589 | 9/1966 | Alexander et al. | 260—78.5 E |
| 3,311,595 | 3/1967 | Kahrs et al. | 260—78.5 E |
| 3,399,103 | 8/1968 | Salyer et al. | 161—218 |
| 3,423,352 | 1/1969 | Levine et al. | 260—78.5 E |
| 3,446,767 | 5/1969 | Nolan | 260—78.5 E |

JOHN T. GOOLKASIAN, Primary Examiner

G. W. MOXON, II, Assistant Examiner

U.S. Cl. X.R.

161—216, 218; 181—33 G, 33 GA; 248—21; 260—41 A, 78.5 E, 80.8, 80.81